Dec. 3, 1946. M. B. MENTLEY 2,411,973
GEAR FINISHING
Filed Jan. 2, 1943 2 Sheets-Sheet 1
FIG.I.
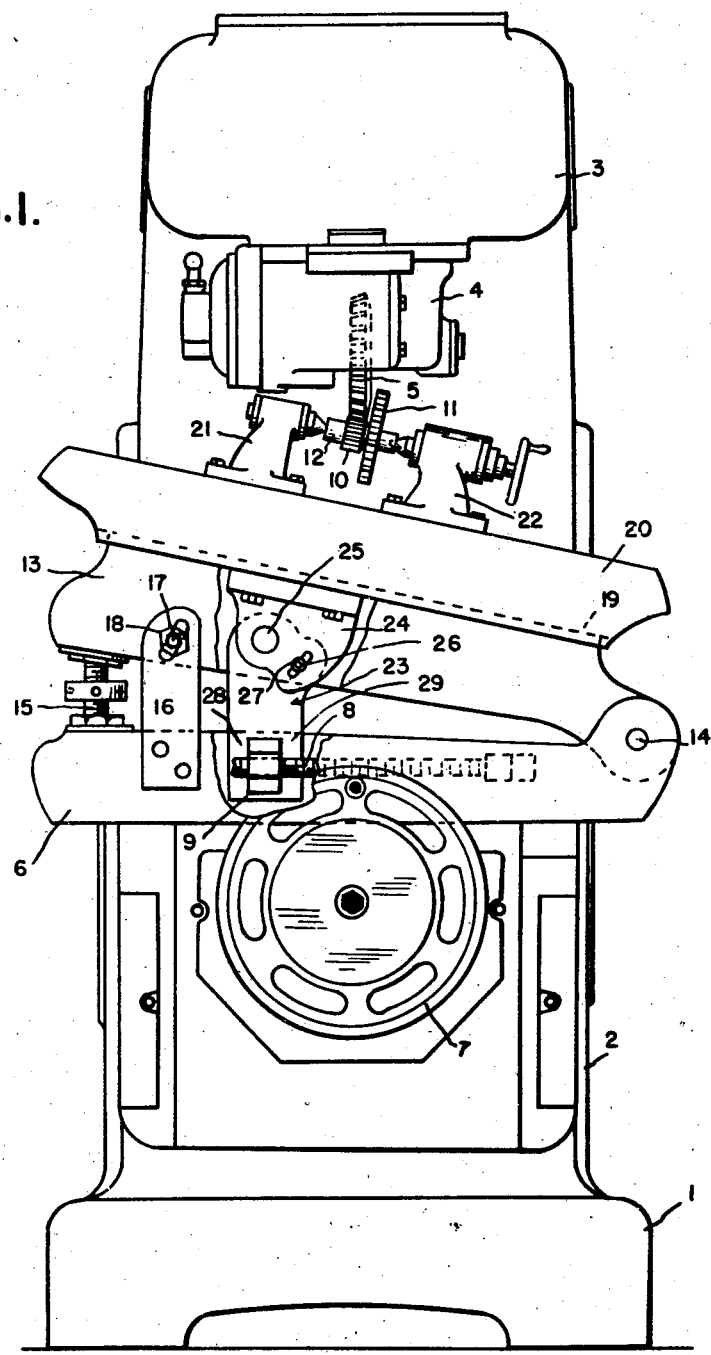
INVENTOR.
MAX B. MENTLEY
BY
ATTORNEYS Patented Dec. 3, 1946

2,411,973

UNITED STATES PATENT OFFICE 2,411,973

GEAR FINISHING

Max B. Mentley, Detroit, Mich., assignor to National Broach & Machine Company, Detroit, Mich., a corporation of Michigan Application January 2, 1943, Serial No. 471,162

6 Claims. (Cl. 90—1.6)

The invention relates to the finishing of gears and refers more particularly to the finishing of gears by shaving.

While a shoulder gear, such as a gear adjoining a larger gear of a gear cluster or adjoining an enlargement, has been finished by shaving with a rotary gear-like cutter at crossed axes to the shoulder gear, it has been impossible to satisfactorily finish in this manner a shoulder gear when the neck between the gear and larger gear or the gear and enlargement is small, such as 1/16" or less.

It is an object of the present invention to finish gears by shaving with a bevel gear-like cutter to enable finishing a shoulder gear when the neck is small.

The invention has for another object to finish helical or spur gears by shaving with a bevel gear-like cutter.

These and other objects of the invention will become apparent from the description, when taken in conjunction with the drawings, in which Figure 1 is a front elevation of a rotary gear cutting machine for carrying out the method embodying the invention;

Figure 3:
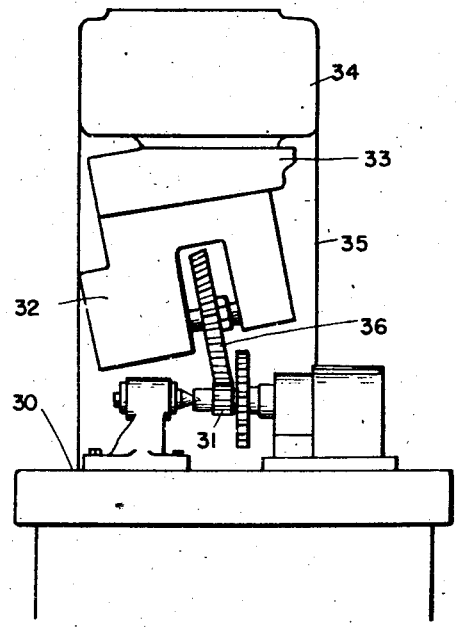
Figure 3 is a front elevation of another form of rotary gear cutting machine.

One form of a rotary gear cutting machine in which my method of cutting gears may be carried out, as illustrated in Figure 1, comprises the base 1 supporting the column 2 having at its upper end the forwardly projecting portion 3. 4 is a head below and having a swivel mounting on the forwardly projecting portion to provide for angular adjustment of the head about its vertical axis. The head carries the gear-like cutter 5 which is rotatable about a horizontal axis and is positively driven by suitable means, such as an electric motor mounted on the column. 6 is a sub-table vertically adjustable on the column. The sub-table may be fed toward and away from the head by the hand wheel 7 and also may be automatically fed toward the head by suitable means. The sub-table carries the screw 8 which is secured from axial movement and has threaded thereon the nut 9.

The construction of the machine as thus far described, including the mechanisms for driving the cutter 5, for vertically adjusting the sub-table 6 through the hand wheel 7, for vertically feeding the sub-table 6 toward the head 4, and for driving the screw 8 is all similar to that described in the R. S. Drummond Patent No. 2,270,421, issued January 20, 1942.

For the purpose of finishing a shoulder gear, such as the gear 10 adjoining the larger gear 11, when the neck between the gears is small, such as 1/16" or less, I have made the gear-like cutter 5 in the nature of a bevel gear-like cutter having conically arranged teeth provided with shallow serrations or gashes extending from the tops to the bottoms thereof. The bevel angle of the teeth is approximately between 3° and 20°. I have arranged this cutter so that it meshes at crossed axes with the gear 10 and with the center of crossed axes between the larger end and the middle of the cutter and with the larger end nearest the shoulder formed by the side of the gear 11 adjoining the gear 10. More specifically, the axes of the cutter 5 and the gear 10 are at an angle to each other and lie in no common plane with the angularity approximately between 2° and 10°. As shown in Figure 1, the axis of the cutter remains horizontal, but may be angularly adjusted in a horizontal plane by angularly adjusting the head 5 about its vertical axis. The axis of the gear 10 and, more particularly, the shaft 12 with which both gears 10 and 11 are integral is inclined to the horizontal at an angle corresponding to the bevel angle of the teeth of the cutter. This is accomplished by providing the table 13 which is pivotally mounted at one end through the pivot 14 on the sub-table 6 and is adapted to be angularly moved about the pivot by the adjusting screw 15 between the sub-table and table at the end opposite the pivot. 16 is a locking plate fixedly secured to the sub-table and adjustably secured to the table by suitable means, such as the bolt 17 and the nut 18. The table is provided in its upper face with the ways 19 extending longitudinally thereof and slidably engaged by the carriage 20 to the upper face of which the headstock 21 and the tailstock 22 are secured. The headstock and the tailstock are constructed in the usual manner and have centers engageable with the ends of the shaft 12. The angle of inclination of the table 13 to the sub-table 6 corresponds to the bevel of the cutter 5. For reciprocating the carriage 20 to relatively reciprocate the cutter 5 and the gear 10 axially of the gear, I have provided the bracket 23 angularly adjustably mounted on the bracket 24 which is fixed to the carriage. The bracket 23, as shown, is pivoted at 25 to the bracket 24 and is fixedly secured in its various positions of angular adjustment by the bolt 26 and the nut 27.

The bracket 23 has the spaced portions 28 and 29 which are abutted by the ends of the nut 9.

With this construction of machine, it will be seen that the bevel gear-like cutter 5 can be placed in mesh with the shoulder gear 10 by vertically adjusting the sub-table 6. It will also be seen that by angularly adjusting the head 4 about its vertical axis the cutter 5 can be set with its axis crossed with respect to the axis of the shoulder gear with an angularity of approximately 2° to 10° and with the center of the crossed axes nearer the larger end of the cutter. It will also be seen that by angularly adjusting the table 13, the desired angle of the axis of the shoulder gear to the axis of the cutter can be secured, as well as the proper compensation for the regrinding of the cutter to secure identical shoulder gears. It will, furthermore, be seen that reciprocation of the carriage 20 and the shoulder gear carried by the carriage for the different angular settings of the table can be readily effected.

Figure 2:
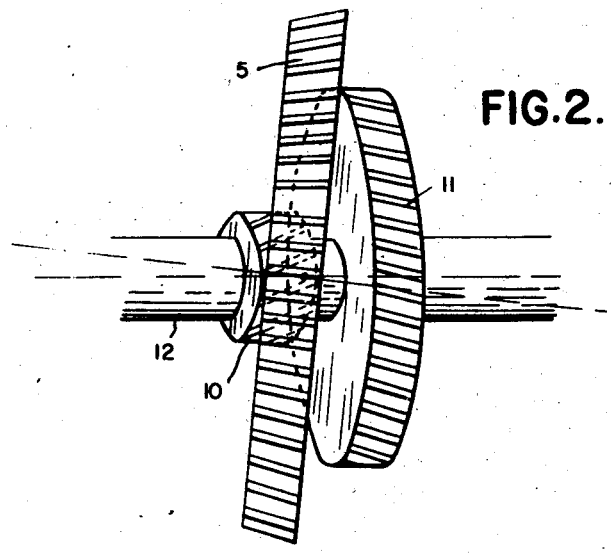
Figure 2 is a diagrammatic top plan view of a cutter and shoulder gear arranged in operative relation to each other.

In carrying out my method, it will be noted that the shoulder gear and the gear-like bevel cutter are placed in mesh at crossed axes with the larger end of the cutter nearest the shoulder and with the center of the crossed axes nearer the larger end of the cutter, as illustrated in Figure 2. It will also be noted that the cutter is positively rotated and thereby rotates the gear while in mesh and that during the rotation the cutter and the gear are relatively reciprocated axially of the gear and the gear is automatically fed toward the cutter at the ends of the reciprocatory stroke until the desired amount of material has been cut from the surfaces of the teeth to thereby properly finish the teeth of the gear without interference by the shoulder which is formed by the face of the larger gear adjoining the face of the smaller gear.

Figure 3 illustrates another form of rotary gear cutting machine in which my method of cutting gears may be carried out. The machine differs essentially from the machine of Figure 1 in that the carriage for the shoulder gear is horizontally reciprocable and the head carrying the bevel gear-like cutter is inclined at an angle to the horizontal corresponding to the bevel angle of the teeth of the cutter. More particularly, 30 is the carriage horizontally mounted on a table and adapted to be reciprocated by a nut and screw in the same manner as illustrated in the above mentioned patent to Drummond. 31 is the shoulder gear mounted on and having a horizontal axis of rotation and adapted to be driven in the same manner as the tool arbor of Figure 1 of the above mentioned Drummond patent. 32 is the head depending from and having a swivel mounting on the adapter 33 which, in turn, depends from and is secured to the forwardly projecting portion 34 at the upper end of the column 35. 36 is the bevel gear-like cutter on the arbor, which latter is journaled in the head.

The machine operates in the same manner as the machine of Figure 1, with the exception that the shoulder gear is positively rotated and in turn rotates the bevel gear-like cutter in mesh with the shoulder gear.

While it is preferable to have the gears and the cutters arranged at crossed axes, the above machines may be used to finish either external or internal gears of shoulder or open type with their axes parallel to the axes of the cutters. Also, if the machines are used to finish open external gears, a crossed axes setting of approximately 3° to 30° may be employed.

What I claim as my invention is:

1. The method of finishing a shoulder gear which comprises meshing at crossed axes the gear solely with a bevel gear-like cutter having its larger end nearest the shoulder, rotating the gear and cutter while in mesh and during the rotation relatively reciprocating the gear and cutter axially of the gear.

2. The method of finishing a shoulder gear member which comprises meshing at crossed axes of approximately 2° to 10° the gear solely with a bevel gear-like cutter member having its larger end nearest the shoulder, rotating one of the members and thereby rotating the other of the members and relatively reciprocating the members during rotation.

3. The method of finishing a shoulder gear which comprises meshing the gear solely with a bevel gear-like cutter having its larger end nearest the shoulder and with the axes of the gear and cutter inclined with respect to each other in transverse planes, rotating the gear and cutter while in mesh, relatively reciprocating the gear and cutter axially of the gear during the rotation, and relatively feeding the gear and cutter toward each other during the relative reciprocation.

4. The method of shaving a shouldered gear which consists in meshing with such a gear a tapered shaving cutter of which the teeth are so arranged with relation to the teeth of the gear that, when the cutter is placed in correct mesh with the gear the cutter is inclined away from the shoulder of the gear and its axis is in crossed relation to the axis of the gear, and running the cutter and gear in mesh together.

5. The method of shaving a shouldered gear which consists in placing a conjugate tapered shaving tool in mesh with the gear with its larger end adjacent to the gear shoulder and its plane both inclined from the meshing point away from the gear shoulder and oblique to the plane of rotation of the gear at such an angle as to cause relative lengthwise slip between the mating teeth in consequence of their simultaneous rotation, and rotating the cutter and gear in mesh with pressure contact between their mating teeth.

6. The method of shaving a shouldered gear which consists in placing a conjugate tapered shaving tool in mesh with the gear with its larger end adjacent to the gear shoulder and its plane both inclined from the meshing point away from the gear shoulder and oblique to the plane of rotation of the gear at such an angle as to cause relative lengthwise slip between the mating teeth in consequence of their simultaneous rotation, rotating the cutter and gear in mesh with pressure contact between their mating teeth, and effecting a relative reciprocation between the cutter and gear in the direction of the axis of the gear.

MAX B. MENTLEY.